United States Patent
Perone et al.

(10) Patent No.: US 10,353,816 B2
(45) Date of Patent: Jul. 16, 2019

(54) PAGE CACHE IN A NON-VOLATILE MEMORY

(71) Applicant: HEWLETT-PACKARD DEVELOPMENT COMPANY, L.P., Houston, TX (US)

(72) Inventors: Christian Perone, Porto Alegre (BR); Diego Rahn Medaglia, Porto Alegre (BR); Joao Claudio Ambrosi, Porto Alegre (BR); James M Mann, Houston, TX (US); Craig Walrath, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/539,817

(22) PCT Filed: Jan. 28, 2015

(86) PCT No.: PCT/US2015/013309
§ 371 (c)(1),
(2) Date: Jun. 26, 2017

(87) PCT Pub. No.: WO2016/122491
PCT Pub. Date: Aug. 4, 2016

(65) Prior Publication Data
US 2018/0196748 A1 Jul. 12, 2018

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/0804* | (2016.01) | |
| *G06F 12/02* | (2006.01) | |
| *G06F 12/0871* | (2016.01) | |
| *G06F 12/0815* | (2016.01) | |

(Continued)

(52) U.S. Cl.
CPC ...... *G06F 12/0804* (2013.01); *G06F 12/0246* (2013.01); *G06F 12/0871* (2013.01); *G06F 3/0623* (2013.01); *G06F 9/4401* (2013.01); *G06F 12/0815* (2013.01); *Y02D 10/13* (2018.01)

(58) Field of Classification Search
CPC ............ G06F 12/0246; G06F 12/0804; G06F 12/0815
USPC ......................................... 711/118
See application file for complete search history.

(56) References Cited

U.S. PATENT DOCUMENTS

| | | |
|---|---|---|
| 5,636,355 A | 6/1997 | Ramakrishnan |
| 6,662,267 B2 | 12/2003 | Stewart |

(Continued)

FOREIGN PATENT DOCUMENTS

| | | |
|---|---|---|
| EP | 1594064 A2 | 11/2005 |
| WO | WO-0043854 | 7/2000 |

OTHER PUBLICATIONS

Corbet, J.; "LFCS: Preparing Linux for Nonvolatile Memory Deviecs", Apr. 19, 2013; 9 pages.

*Primary Examiner* — Edward J Dudek, Jr.
*Assistant Examiner* — Sidney Li
(74) *Attorney, Agent, or Firm* — Trop, Pruner & Hu PC

(57) ABSTRACT

A system includes a non-volatile memory to store a page cache that contains pages of data allocated by an operating system, the pages in the page cache being persistent across a power cycle of the system. The page cache is located in a specified region of the non-volatile memory and is to store the pages of data without tagging a memory region.

12 Claims, 2 Drawing Sheets

(51) Int. Cl.
*G06F 3/06* (2006.01)
*G06F 9/4401* (2018.01)

(56) References Cited

U.S. PATENT DOCUMENTS

| | | |
|---|---|---|
| 8,423,740 B2 | 4/2013 | Koning |
| 8,661,194 B2 | 2/2014 | Nam |
| 2002/0010837 A1* | 1/2002 | Fujinami ............... G06F 9/3812 |
| | | 711/123 |
| 2006/0149902 A1 | 7/2006 | Yun et al. |
| 2007/0033343 A1* | 2/2007 | Iida et al. ............. G06F 3/0604 |
| | | 711/114 |
| 2007/0150654 A1* | 6/2007 | Shin .................... G06F 12/0246 |
| | | 711/118 |
| 2008/0189547 A1* | 8/2008 | Sugiyama ............. G06F 21/445 |
| | | 713/169 |
| 2009/0063810 A1 | 3/2009 | Garcia-Tobin |
| 2012/0173824 A1 | 7/2012 | Iyigun et al. |
| 2012/0233472 A1 | 9/2012 | Faraboschi |
| 2013/0275661 A1 | 10/2013 | Zimmer |
| 2014/0281454 A1 | 9/2014 | Even et al. |

\* cited by examiner

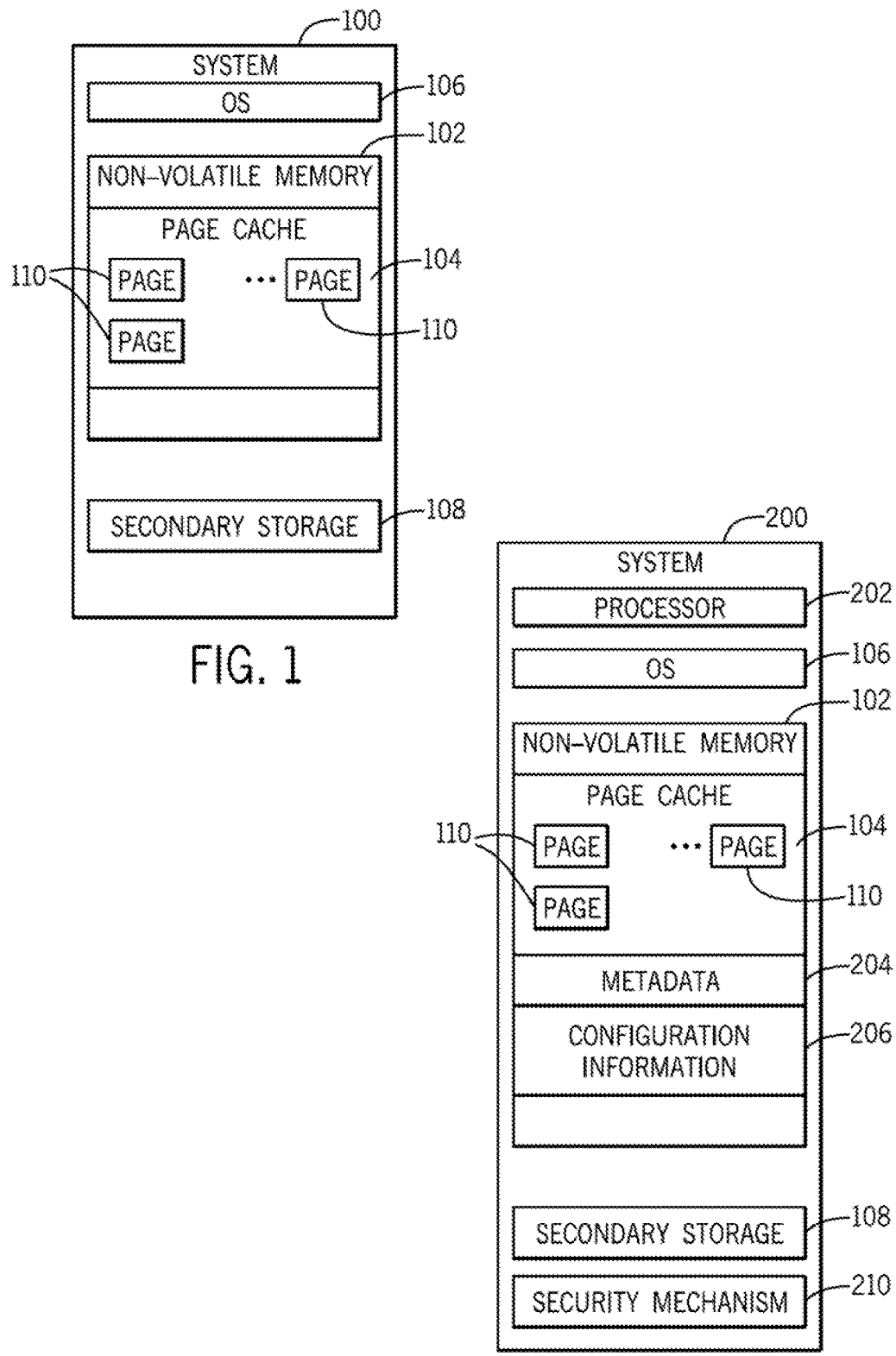

PAGE CACHE IN A NON-VOLATILE MEMORY

BACKGROUND

A system can include a processor and various types of storage, including a main memory and secondary storage. The main memory is typically implemented with one or multiple memory devices with faster access speeds than storage device(s) used to implement the secondary storage. Data stored in the main memory can be accessed by the processor more quickly than in the secondary storage.

BRIEF DESCRIPTION OF THE DRAWINGS

Some implementations are described with respect to the following figures.

FIG. 1 is a block diagram of an example system that includes a non-volatile memory containing a page cache according to some implementations.

FIG. 2 is a block diagram of another example system that includes a non-volatile memory containing a page cache according to further implementations.

DETAILED DESCRIPTION

Figure 3:
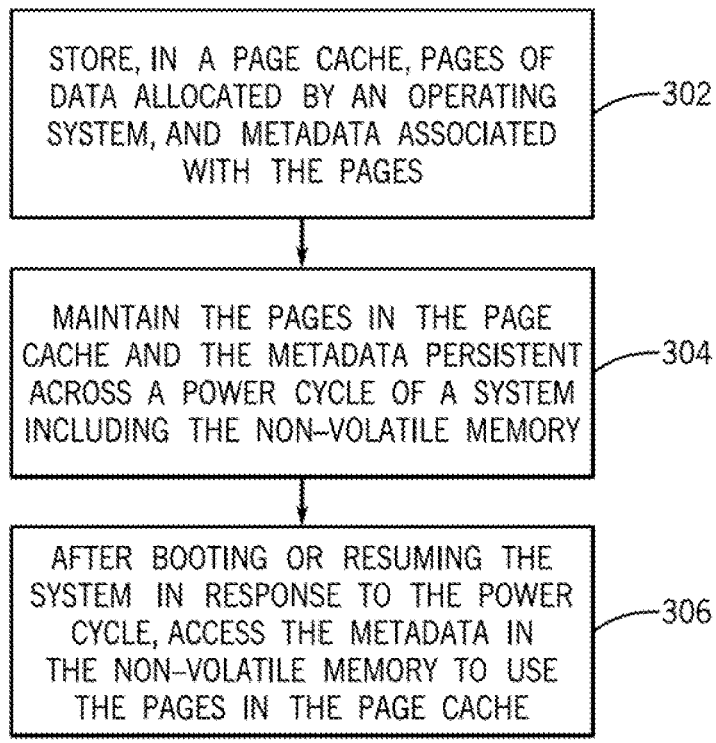
FIG. 3 is a flow diagram of an example process according to some implementations.

A page cache is used by an operating system to cache data that is the subject of an access (read access or write access) of a secondary storage, such as a solid state drive (implemented with one or multiple flash memory devices) or a disk-based storage. The page cache can be stored in main memory, which has a higher access speed than the slower secondary storage. Any subsequent access of data that can be satisfied from the page cache improves data access performance, since an input/output (I/O) operation to the secondary storage can be avoided.

Data can be stored as pages in the page cache. A page can refer to a data structure or container, of a specified size, that contains respective data. A page can be allocated by an operating system when data is to be loaded into the main memory. Examples of data can include user data or application data, machine-executable instructions of one or multiple programs, information associated with a kernel of the operating system, and so forth. The operating system can deallocate pages under certain conditions, such as when additional space in main memory has to be provided.

When data is read from the secondary storage, the data is copied to the page cache, and any subsequent access of the data can be satisfied from the page cache. When data is written, the write data is first written to the page cache, and the page containing the write data can be marked as a dirty page. A dirty page contains data that has been modified from respective data in the secondary storage.

If the page cache is stored in volatile main memory, then a power cycle of a system would cause the content of the page cache to be lost. A power cycle of a system can refer to removing power from the system (or a subset of the system), followed by a subsequent application of power to the system (or the subset of the system). Removing power from the system (or a subset of the system) can cause power to be removed from the volatile main memory.

A power cycle can occur when the system is shut off and subsequently powered back on. A power cycle can also occur when the system is placed into a lower power state, such as a hibernation state, and later resumed to a prior state.

If the page cache is lost due to a power cycle, then the data of the page cache would not be available on a system start after the power cycle. As a result, the operating system would have to reinitialize and re-populate the page cache. Moreover, if a page cache contains a dirty page, then data in the dirty page can be lost due to loss of the page cache. Starting a system can include booting the system which includes starting the operating system to begin from an initial state. Alternatively, starting a system can include resuming the system to a prior state that is saved in state information. The prior state of a system can refer to a state at a time when one or multiple programs are executing. The state information can include information relating to a current execution state of machine-executable instructions (e.g. an operating system, application code, etc.) that were executing in the system prior to entering a lower power state (e.g. hibernation state, power off state, etc.).

In accordance with some implementations according to the present disclosure, a page cache is stored in non-volatile memory instead of volatile memory. By storing the page cache in the non-volatile memory, the pages in the page cache can be maintained persistent across a power cycle. Thus, even if power is removed from the non-volatile memory and later re-applied, the pages of the page cache remain available. The pages in the page cache can include more frequently accessed data used by one or multiple programs (including applications, the operating system, etc.), such that operations of the system in general can be sped up.

FIG. 1 is a block diagram of an example system 100. Examples of the system 100 include any of the following: a desktop computer, a notebook computer, a tablet computer, a server computer, a smartphone, a personal digital assistant, a mobile phone, a wearable device, a communication device, a storage server, a game appliance, a smart sensor, an Internet of Things (IoT) device, a home controller, a system controller, a micro-controller, and so forth.

In other examples, the system 100 can include a system-on-a-chip (SoC) device. A SoC device can refer generally to any chip including an integrated circuit die or an arrangement of dies that is (are) encapsulated within a package, and on which at least a processor and an on-chip memory are provided. The SoC device can also include other components. An "on-chip" memory can refer to a memory device(s) that is (are) mounted in the same chip as the processor and possibly other components.

As depicted in FIG. 1, the system 100 includes a non-volatile memory 102 that includes a page cache 104. The system 100 also includes an operating system 106. The operating system 106 can include a kernel that manages access by code of hardware resources of the system 100, performs file access management (to manage access of files), performs process management (to manage execution of processes), and so forth. The operating system 106 can also include additional code, in addition to the kernel, which can perform specified tasks (examples of such additional code can include a user interface application, libraries, etc.).

The system 100 also includes a secondary storage 108. The secondary storage 108 is separate from the non-volatile memory 102, and can be implemented with slower storage than the non-volatile memory 102. Examples of the secondary storage 108 can include a solid state drive (e.g. implemented with one or multiple flash memory devices), a disk-based storage, and so forth. The secondary storage 108 can also be implemented using memory devices (for example another non-volatile memory).

Examples of the non-volatile memory 102 include any one or some combination of the following: resistive random access memory (RRAM), memristor memory, phase-change random access memory (PCM, PCRAM, or PRAM), magnetoresistive random access memory (MRAM), spin-transfer torque random access memory (STT-RAM), flash memory, backup-power-backed volatile memory, and so forth.

In some implementations, the non-volatile memory 102 can be a byte-addressable memory. A byte-addressable memory is a memory in which individual bytes of data can be read and written. In other words, an individual byte of data can be read from or written to the byte-addressable memory without reading/writing other parts of memory. A byte-addressable memory is distinguishable from a memory where a read operation or a write operation has to be performed on a block of data, where the block of data is larger than a byte.

More generally, implementations according to the present disclosure can be included in any system that has different storage components in a hierarchy of storage components, where the storage components at different levels of the hierarchy have different performance levels (e.g. different access speeds). The page cache 104 can be implemented in a storage component that has a higher performance level than another storage component in the hierarchy with a lower performance level.

The page cache 104 stores pages 110 that are allocated by the operating system 106 to store data retrieved from the secondary storage 108 or from another storage. Allocating a page in the page cache 104 can refer to provisioning, configuring, or creating a defined region of the page cache 104, by the operating system 106, to store specific data (e.g. data read from the secondary storage 108). The operating system 106 can deallocate the one or multiple pages under certain conditions.

By providing the page cache 104 in the non-volatile memory 102, the pages 110 in the page cache 104 are persistent across a power cycle of the system, in which power is removed from the non-volatile memory 102 as well as other components. In some implementations, the page cache 104 is located in a specified region of the non-volatile memory 102, such that this specified region is known to the operating system 106 when the operating system 106 is initially loaded and started in the system 100 after a system boot or resume procedure.

For example, the specified region of the non-volatile memory 102 that includes the page cache 104 can be identified in a boot parameter used during a boot or resume procedure of the system 100 and accessible by the operating system 106. The boot parameter can store an address of the starting location of the page cache 104, and also can specify the size of the page cache 104. More generally, configuration information can be provided that is accessible by the operating system 106 to identify the specified region in the non-volatile memory 102 that includes the page cache 104. In some implementations, the specified region of the non-volatile memory 102 that contains the page cache 104 is a fixed region, which does not change in successive boot/resume cycles.

The operating system stores the pages 110 of data in the page cache 104 without having to tag any memory region. Tagging a memory region can refer to identifying a region of data in memory or other storage that is to be included in the page cache 104. Tagging the memory region can involve first identifying (such as by the operating system, a user, or another entity) content of the memory region to include in the page cache 104, before such content can be stored in the pages 110 of the page cache 104. Having to perform such tagging or identification of content of a memory region prior to storing the data of such memory region in the page cache 104 can result in added complexity of the system 100, and can be restrictive as to what is stored in the page cache 104.

In accordance with some implementations according to the present disclosure, the data that is stored in the pages of the page cache 104 can include machine-readable instructions, files, and other data that are accessed with higher frequency. As a result, the data that is stored in the page cache 104 can provide a profile of system use. Data that is frequently and repeatedly accessed is more likely to be present in the page cache 104, and thus it is more likely that an application or operating system would be able to use data in the page cache 104 during operation of the application or operating system.

By maintaining the page cache 104 in the non-volatile memory 102, the system 100 does not have to spend time loading data into the page cache 104 from the slower secondary storage 108 on the next start of the system 100. As a result, a boost in performance of the system 100 can be achieved when the system 100 is started. Also, loss of data in dirty pages of the page cache 104 can be avoided.

FIG. 2 is a block diagram of another example system 200 according to further implementations. The system 200 includes the non-volatile memory 102, the operating system 106, and the secondary storage 108. In addition, the system 200 includes a processor 202 (or multiple processors). The processor 202 can be a microprocessor, or a processing core of a microprocessor. As other examples, the processor 202 can include a digital signal processor (DSP), a microcontroller, an application specific integrated circuit (ASIC) device, a programmable gate array, and so forth.

In the example of FIG. 2, the non-volatile memory 102 includes the page cache 104, as well as a region to store metadata 204 and a region to store configuration information 206. The metadata 204 can include information relating to the pages 110 in the page cache 104. As examples, respective information in the metadata 204 for a given page can identify an entity that the given page is associated with. The entity can be a file stored in the system 200, or the entity can be a program (machine-executable instructions), or the entity can be a raw data block associated with a block-based storage device. The given page contains data for the associated entity (e.g. the given page stores data of the file, the given page stores a portion of code of a program, the given page stores data accessed by a program, etc.).

The configuration information 206 can include information regarding the specified region in the non-volatile memory 102 that contains the page cache 104 and the metadata 204. The configuration information 206 is accessible by the operating system 106 when the operating system 106 is started in the system 200 by a boot or resume procedure to find the regions in the non-volatile memory 102 that contain the page cache 104 and the metadata 204. This allows the operating system 106 to quickly find the page cache 104 and the metadata 204, such that when the operating system 106 is started, the operating system 106 can consult the metadata 204 to identify the entities associated with the pages 110 in the page cache 104. In addition, the operating system 106 is able to maintain references to the various pages 110 in the page cache 104 across a power cycle, such that these references are used by the operating system 106 to retrieve the pages 110. A reference can refer to a pointer to a storage location of a respective page.

In each of FIGS. 1 and 2, a separate volatile main memory is not depicted. In such implementations, a region in the non-volatile memory 102 can be used to store data that is traditionally stored in the volatile main memory. In other examples, a separate volatile main memory can be provided in the system 100 or 200.

The presence of the non-volatile memory 102 can also present various security issues. Traditionally, main memory is volatile, such that a system power cycle would cause data present in the main memory to be lost, so that such data would not be accessible by unauthorized entities (e.g. malware or other programs) after the system power cycle. However, since the non-volatile memory 102 is used to store the page cache 104 that is traditionally lost after a power cycle, some implementations of the present disclosure can implement a security mechanism 210 (FIG. 2) to prevent tampering with the non-volatile page cache 104 to ensure that the data in the page cache 104 stays valid, consistent, and safe across power cycles.

In some examples, the security mechanism 210 can maintain one or multiple keys to encrypt the regions of the non-volatile memory 102 that store the page cache 104 and the metadata 204. Thus, any entity without the key(s) would not be able to decrypt the encrypted memory region, and thus would not be able to access the content of the encrypted memory region. The encrypted memory region can be decrypted by the security mechanism 210 after a system start (boot or resume), after it is verified that no unauthorized entity is attempting to access the page cache 104 or the metadata 204. The security mechanism 210 can be implemented as a combination of machine-executable instructions and processing hardware, or can be implemented with just processing hardware.

FIG. 3 is a flow diagram of a process according to some implementations, which can be performed in the system 100 or 200. The process stores (at 302), in the page cache 104, pages of data allocated by the operating system 106, and the metadata 204 associated with the pages 110. The storing of the pages of the page cache 104 is performed without first identifying content of any memory region to include in the page cache 104.

In response to a power cycle of the system 100 or 200, the pages 110 in the page cache 104 and the metadata 204 are maintained (at 304) persistent across the power cycle. After starting (booting or resuming) the system in response to the power cycle, the operating system 106 can access (at 306) the metadata 204 in the non-volatile memory 104 to use the pages 110 in the page cache 104.

As noted above system performance is improved by using data available in the pages of the page cache 104. In addition, persistence of the page cache 104 in the relatively fast byte-addressable non-volatile memory 102 can allow a system to be powered off, thereby achieving power savings, while still allowing for fast starting of the system from the power off state. Turning the system to the power off state can achieve greater power savings than transitioning the system to a sleep state in which power is still provided to volatile main memory.

Figure 4:
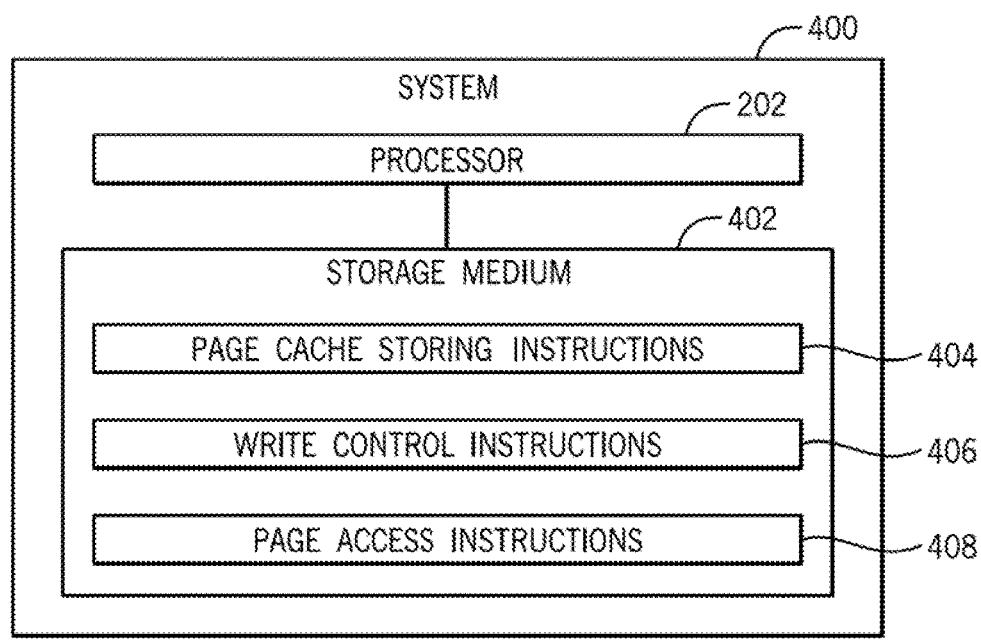
FIG. 4 is a block diagram of a further example system according to additional implementations.

FIG. 4 is a block diagram of an example system 400, which can be the system 100 or 200 (for example), in accordance with further implementations. The system 400 includes the processor 202 and a non-transitory machine-readable or computer-readable storage medium (or storage media) 402. The storage medium (or storage media) 402, can store various machine-readable instructions, including page cache storing instructions 404 to store pages of data allocated by the operating system 106 in the page cache 104 stored in the non-volatile memory 102. The machine-readable instructions further include write control instructions 406, which can, in response to a write or writes, indicate at least one page of the pages in the page cache 104 as being dirty with respect to corresponding data in the secondary storage 108.

The machine-readable instructions also include page access instructions 408, which control access, by the operating system 106, of the pages in the page cache 104 after starting the system 400 in response to a power cycle.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
an operating system;
a non-volatile memory to store a page cache that contains pages of data allocated by the operating system, the pages in the page cache being persistent across a power cycle of the system, and the page cache located in a specified region of the non-volatile memory and to store the pages of data without tagging a memory region, and the non-volatile memory is to further store a metadata region that contains metadata associated with the pages in the page cache, the metadata being persistent across the power cycle, the metadata identifying entities to which the pages in the page cache belong, the entities comprising files and program code, wherein the non-volatile memory is to store a boot parameter that identifies the specified region of the non-volatile memory; and
a secondary storage,
the operating system to indicate, in response to a write, at least one of the pages in the page cache as being dirty with respect to corresponding data in the secondary storage,
the operating system to access the boot parameter during a boot or resume of the system to find the specified region in the non-volatile memory, and
the operating system to access the metadata in the metadata region to identify the entities to which the pages in the page cache belong.

2. The system of claim 1, wherein the operating system is to maintain references to the pages in the page cache across the power cycle.

3. The system of claim 1, wherein the page cache is to store the pages of data automatically without any identification of data to be included in the page cache by an entity.

4. The system of claim 1, wherein the pages in the page cache contain at least one of data or program code.

5. The system of claim 1, wherein the metadata identifies programs to which the pages in the page cache belong, and the operating system is to access the metadata in the metadata region to identify the programs to which the pages in the page cache belong.

6. A method comprising:
storing, in a page cache in a non-volatile memory, pages of data allocated by an operating system, and metadata associated with the pages, the page cache located in a specified region of the non-volatile memory and storing the pages of data in the page cache is performed without first identifying content of a memory region to include in the page cache, and the metadata identifying programs to which the pages in the page cache belong, wherein the non-volatile memory stores a boot parameter that identifies the specified region of the non-volatile memory;

in response to a power cycle of a system including the non-volatile memory, maintaining the pages in the page cache and the metadata persistent across the power cycle;

accessing, by the operating system, the boot parameter during a boot or resume of the system to find the specified region in the non-volatile memory and to access the page cache in the specified region; and after booting or resuming the system in response to the power cycle, accessing the metadata in the non-volatile memory to identify the programs to which the pages in the page cache belong and to use the pages in the page cache.

7. The method of claim 6, further comprising:
maintaining, by the operating system, references to the pages in the page cache and the metadata across the power cycle.

8. The method of claim 6, further comprising:
indicating, by the operating system, at least one page of the pages as dirty in response to a write operation.

9. The method of claim 6, further comprising:
encrypting, using at least one key, at least one region of the non-volatile memory storing the page cache and the metadata.

10. An article comprising at least one non-transitory machine-readable storage medium storing instructions that upon execution cause a system to:
store, in a page cache in a non-volatile memory, pages of data allocated by an operating system, the page cache located in a specified region of the non-volatile memory and storing the pages of data in the page cache is performed without first identifying content of a memory region to include in the page cache, wherein the pages in the page cache are persistent across a power cycle, wherein the non-volatile memory is to store a boot parameter that identifies the specified region of the non-volatile memory;

store metadata in the non-volatile memory, the metadata identifying programs or files to which the pages in the page cache belong;

in response to a write, indicate at least one page of the pages in the page cache as being dirty with respect to corresponding data in a secondary storage;

access, by the operating system, the boot parameter during resuming or booting of the system in response to the power cycle to find the specified region in the non-volatile memory; and after the resuming or booting of the system in response to the power cycle:
  access, by the operating system, the metadata to identify the programs or files to which the pages in the page cache belong, and
  access, by the operating system, the pages in the page cache that have been maintained persistent across the power cycle.

11. The article of claim 10, wherein the metadata is persistent across the power cycle.

12. The article of claim 10, wherein the metadata identifies programs to which the pages in the page cache belong, and the instructions upon execution cause the system to access, by the operating system, the metadata to identify the programs to which the pages in the page cache belong.

* * * * *